United States Patent [19]

Lee et al.

[11] 3,978,354

[45] Aug. 31, 1976

[54] PERMANENT MAGNET ELECTRICAL MACHINES

[75] Inventors: Winston F. Z. Lee, Delmont; James A. Hrivnak; John R. Speer, both of Pittsburgh, all of Pa.

[73] Assignee: Rockwell International Corporation, Pittsburgh, Pa.

[22] Filed: Nov. 13, 1972

[21] Appl. No.: 305,899

Related U.S. Application Data

[63] Continuation of Ser. No. 86,456, Nov. 3, 1970, abandoned.

[52] U.S. Cl. .............................. 310/60 R; 310/62; 310/63
[51] Int. Cl.² ........................................ H02K 9/06
[58] Field of Search ............... 310/154, 155, 55, 62, 310/63, 47, 50, 52, 156, 152

[56] References Cited
UNITED STATES PATENTS

| | | | |
|---|---|---|---|
| 2,707,242 | 4/1955 | Baudry | 310/55 X |
| 3,427,484 | 2/1969 | Karlby et al. | 310/47 |

OTHER PUBLICATIONS

"Ceramic Magnets for a New Generation of PM Motors," Leow and Gilhardt, *Insulation/Circuits*, 7/70, vol. 16, No. 8.

*Primary Examiner*—Donovan F. Duggan

[57] ABSTRACT

Electrical machines comprising a rotatable armature and permanent magnets surrounding and separated from the armature by air gaps having a length to width ratio not greater than 60:1 and a minimum width of 0.040 inch irrespective of the length to width ratio, thereby allowing cooling air to be circulated through the air gaps as well as through the annular gaps between the magnets. Such machines have a substantially higher steady state power output than permanent magnet machines of the same overall dimensions designed in accord with conventional techniques because of materially improved armature cooling.

5 Claims, 5 Drawing Figures

PERMANENT MAGNET ELECTRICAL MACHINES

This application is a continuation of application Ser. No. 86,456 filed Nov. 3, 1970, now abandoned.

This invention relates to electrical machines and, more particularly, to novel improved electrical machines of the permanent magnet type.

For the sake of convenience, the principles of the present invention will be developed by describing their application to permanent magnet motors. However, these principles are equally applicable to generators employing permanent magnet fields. The term "machine" as used herein and in the appended claims is accordingly intended to cover generators as well as motors.

A permanent magnet motor is one in which permanent magnets are used to produce the main flux instead of the conventional field coils. Such motors can be operated at high speeds, and there is a minimum variation of speed under load. Also, such motors have good commutation and relatively low eddy current losses.

Advanced permanent magnet motors are disclosed in U.S. Pat. No. 3,427,484 issued Feb. 11, 1969, to Henning Karlby et al. for PERMANENT STATOR D.C. MOTOR WITH HAND TOOL GEAR TRAIN.

Heretofore, permanent magnet motors have been designed along the same lines as motors with wound coil fields in that the air gaps between the faces of the permanent field magnets and the motor armature have been made as small as possible to minimize flux losses across the air gap. Torque or power output is proportional to flux density. The torque generated by an electric motor decreases as flux losses increase because of the reduced flux density in the magnetic circuit of the motor. Typically, in conventional design practice, the maximum allowable gap width is 0.030 inch.

With the width of the air gap held to this maximum, the ratio of the length to the width of the air gap will invariably approach or even exceed 100:1 in a permanent magnet motor. In these circumstances, there is almost total resistance to flow through the air gap and, with the possible exception of subminiature motors (by sub-miniature motors are meant those in which the armature is not over one inch long. Such motors are for the most part restricted to use in toy cars and trains and the like), dissipation of the heat generated by $I^2R$ losses in the armature becomes a problem since the only cooling air is that flowing through the gaps between the magnets. In a typical permanent magnet motor, the total of the angular distances between the magnets is only about 90°–100°; that is, only about one-fourth of the circumference of the armature can be contacted by the cooling air.

Accordingly, armature currents must be restricted to comparatively low levels to prevent unacceptably high temperature rises during motor operation. As the power output of a permanent magnet motor is proportional to the armature current, the power outputs of such motors are also relatively low.

It has now surprisingly been found that it is unnecessary to adhere to the heretofore accepted 0.030 inch maximum width for the air gap in permanent magnet motors if magnets having high coercivity are employed. More particularly, if such magnets are employed, the width of the air gaps may be increased and the air gap length to width ratio decreased to an extent sufficient to allow air to be freely circulated through the air gaps with only a slight increase in the flux loss across the air gaps. The small power decrease attributable to increased flux loss is more than offset by the power increases which can be realized by increasing the air gap width and decreasing the air gap length to width ratio. As will be discussed hereinafter, it is important in the practice of the present invention that the length to width ratio of the air gap not exceed 60:1 and that the air gap be at least 0.040 inch wide irrespective of this ratio.

Specifically, by modifying the air gap design in the manner just described, the armature can be more efficiently cooled; and the flow of current through the armature can accordingly be materially increased without danger of overheating. As power output is proportional to the magnitude of armature current, the net result is a substantial increase in power output. As suggested above, this increase is much greater than the power decrease attributable to the decrease in flux density which results from increasing the air gap width.

Reducing the length to width ratio of the air gap also has the advantage of easing motor part tolerances. In addition, the increased air flow can have a beneficial effect on both commutation and magnetic materials.

One important object of the present invention resides in the provision of novel, improved electric machines of the permanent magnet type.

Another important object of the present invention resides in the provision of permanent magnet electrical machines which are improvements over those disclosed in the above-cited U.S. Pat. No. 3,427,484.

Yet another important object of the invention resides in the provision of novel, improved permanent magnet machines in which there is improved air flow between the armature and the faces of the permanent magnets and in which steady state power ratings are accordingly increased.

A related and important but more specific object of the invention resides in the provision of novel, improved permanent magnet machines in which the length to width ratio of the air gaps between the armature and the permanent magnets does not exceed 60:1 and in which the width of the air gaps is in any event at least 0.040 inch.

Other important objects and features and further advantages of the present invention will become apparent from the appended claims and as the ensuing detailed description and discussion proceeds in conjunction with the accompanying drawing, in which:

Figure 1:
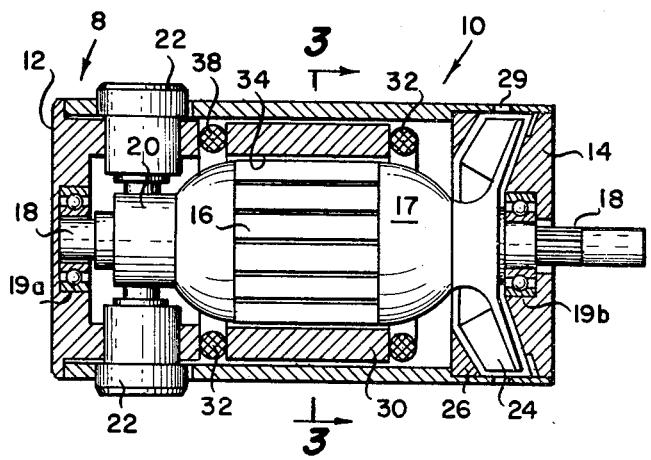
FIG. 1 is a longitudinal section through a permanent magnet motor constructed in accord with the principles of the present invention.
Figure 2:
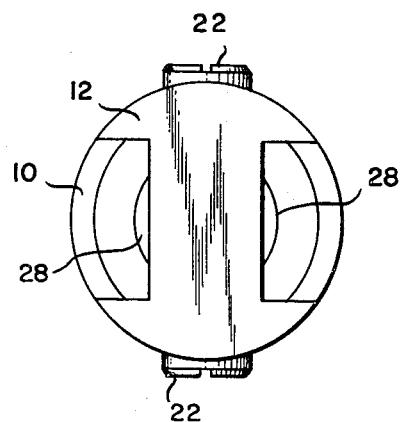
FIG. 2 is a left-hand end view of the motor of FIG. 1.
Figure 3:
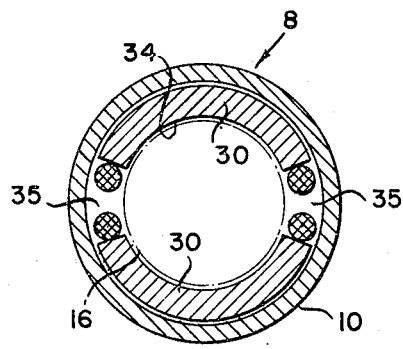
FIG. 3 is a section through the motor of FIG. 1, taken substantially along line 3—3 of FIG. 1.

Referring now to FIGS. 1–3 of the drawing, motor 8, which is constructed in accord with the principles of the present invention, includes a cylindrical casing 10 which is made of a soft magnetic material and provides a return path for the magnetic circuit of the motor.

Housed in casing 10 are a rear bearing and brush support member 12 and a front bearing support member 14. These may be of plastic or metal and may also act as end members for casing 10.

Also housed in casing 10 is an armature 16 of conventional construction. The armature includes a winding 17 and a shaft 18 journalled in rear and front bearings 19a and 19b, which are mounted in support members 12 and 14.

Motor 8 is equipped with the usual commutator 20 and brush assemblies 22. The brush assemblies are mounted in rear support member 12 adjacent the commutator.

A fan 24 is mounted on armature shaft 18 near front bearing 19b, and a ring-shaped shroud 26 is positioned between the fan and armature 16. Air is drawn into casing 10 through air intake openings 28 by fan 24. After circulating through the motor, the air is discharged through ports 29 opposite fan 24.

High coercivity ceramic or comparable permanent magnets 30 are secured in casing 10 around and in spaced relation to armature 16 by any suitable method. These magnets may be of ferrite, as an example. Magnets of the ferrite type are also known as MAGNETO-PLUMBITE magnets. They are made from a material having the formula $MO.6Fe_2O_3$ where M is barium, strontium, and/or lead. Suitable magnets are also available from Indiana General Corp. under the trade name Indox and from Allen-Bradley Company, among others.

Magnets 30 are at least partially surrounded by coils 32 which are preferably connected in series with armature 16, but may be connected in parallel with it. These coils are so wound on the permanent magnets that, when energized, they produce a flux which is additive to the flux produced by the permanent magnets. Coils 32 produce a high strength field during starting and during reversing and blocked rotor conditions to prevent damagnetization of the permanent magnets. The manner in which coils 32 function and various arrangements for hooking up these coils are described in detail in U.S. Pat. No. 3,427,484 to which the reader may refer, if desired.

Motors in accord with the present invention as thus far described are similar to those disclosed in U.S. Pat. No. 3,427,484. The latter are designed in accord with conventional techniques; that is the air gap width is held to a maximum of 0.030 inch. With the air gaps this narrow, the air gap length to width ratio is very high; and it is as a practical matter impossible to circulate useful quantities of cooling air between the permanent magnets and the armature. Therefore, the only armature cooling air is that which flows through the gaps 35 between the magnets. However, as discussed above, these gaps typically span only about one-fourth of the circumference of the armature. Consequently, the air flowing through these gaps can remove only a relatively limited amount of heat. As a result, the armature current must be restricted to a relatively low magnitude to keep the temperature rise of the motor during operation to the specified level. Since power output is proportional to armature current, the power output of permanent magnet motors with conventionally designed air gaps are comparatively low because of the armature cooling problem.

In contrast to conventionally designed permanent magnet motors including those disclosed in U.S. Pat. No. 3,427,484, the length to width ratio of the air gaps 34 in the motors of the present invention is kept to a maximum of 60:1 (it is preferably 40:1 or 30:1 or lower), and the air gaps are always made at least 0.040 inch wide irrespective of the air gap length to width ratio.

Figure 4:
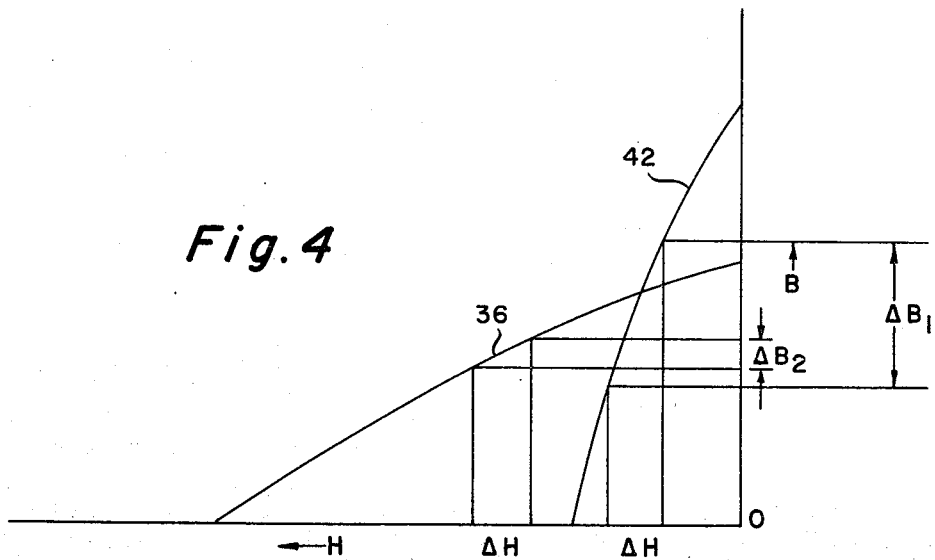
FIG. 4 is a diagram including magnetization curves for motors employing low coercivity permanent magnets and for permanent magnet motors in accord with the present invention.

The reason for the unique capabilities of motors constructed in accord with the principles of the present invention just described can best be understood by referring to FIG. 4. In this Figure reference character 36 identifies the operating portion of the magnetization curve for a motor of the type with which the present invention is concerned. As shown in FIG. 4, the magnetization curve 36 for a motor in accord with the present invention has a relatively gentle slope. Accordingly, a relatively large increase in air gap width produces a correspondingly large decrease $\Delta H$ in field intensity, but only a relatively small decrease $\Delta B_2$ in flux density. Torque is proportional to flux density. Therefore, a relatively large increase in the air gap width produces only a small decrease in torque or power output.

To particularize the foregoing, doubling the width of the air gap in a permanent magnet electric motor employing low coercive magnets (curve 42) will typically decrease the flux of the motor as much as 50%. Doubling the width of the same air gap in a motor in accord with the present invention, in contrast, will result in a flux decrease of less than 10%.

In short, by employing high coercive magnets and dimensioning the air gaps of permanent magnet motors as described above, flux losses across the air gaps are not increased more than a few percent. At the same time, however, this novel change allows air to be circulated through air gaps 34 by fan 24 as well as through the gaps 35 between the magnets. The result is that the armature is completely surrounded by a flow of cooling air. Thus, much greater quantities of heat can be carried away from the armature than in conventional motors where the only air flow is through the annular gaps between the permanent magnets. This permits the flow of current through the armature to be substantially increased with a consequent increase in power output.

To demonstrate the advantages of the present invention, a motor as described above having an air gap width of 0.025 inch and a conventional length to width ratio was constructed and tested. The continuous or steady state (75°C above ambient temperature) rating of the motor was 1.0 horsepower.

The width of the air gap was then increased to approximately 0.070 inch (this reduced the length to width ratio of the air gap to well below 50:1). The motor was otherwise unchanged. The motor was then retested; and it was found that the steady state rating of the motor had increased to 1.7 horsepower.

In conjunction with the foregoing, the 0.040 inch minimum air gap width employed in electrical machines in accord with the present invention is by no means arbitrary, but is of considerable importance. Specifically, curves 38 and 40 in FIG. 5 are plots of air gap width versus armature current for a motor of the type with which the present invention is concerned having a 2.5 inch long armature (these curves are based on actual test data).

Figure 5:
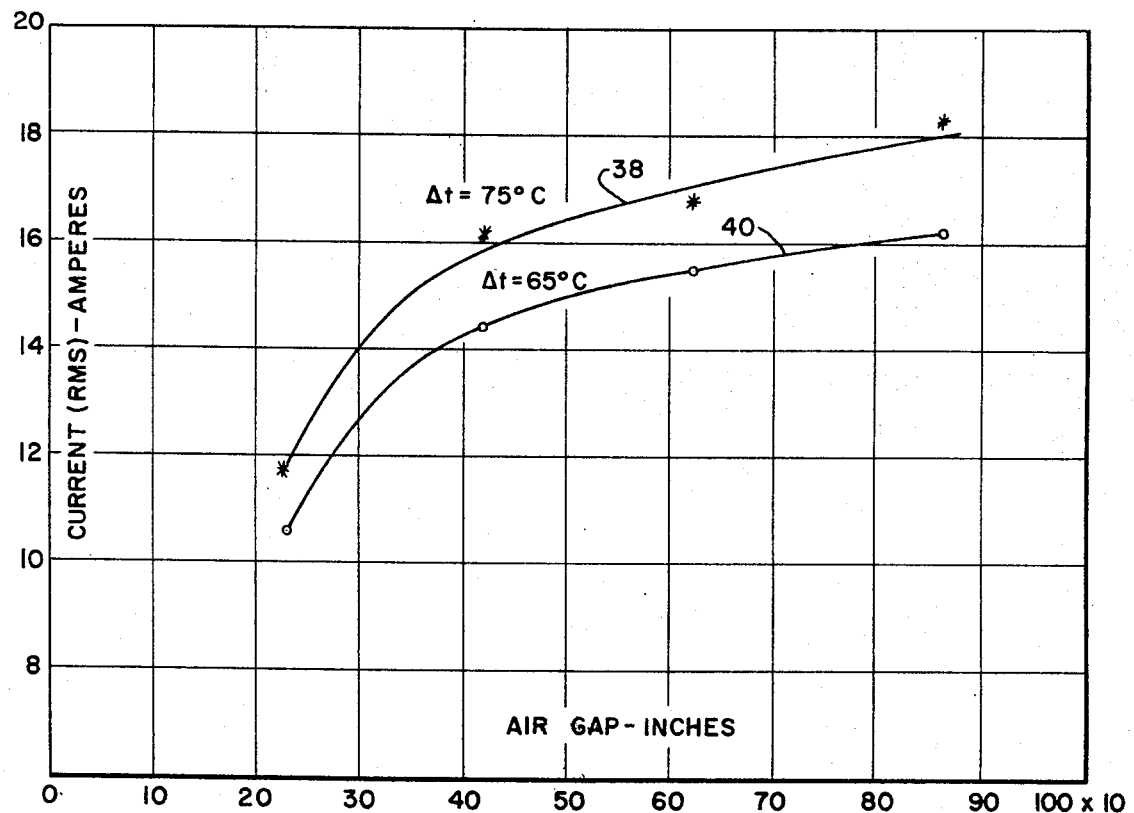
FIG. 5 is a graph containing test data based curves showing the effect of air gap width on steady state power output in permanent magnet motors employing high coercive magnets.

It is readily apparent from FIG. 5 that armature current and consequently power output decreased only very gradually as the width of the air gap width was reduced from 0.086 inch to approximately 0.040 inch. However, below 0.040 inch, reductions in the width of the air gap resulted in much larger reductions in the armature current and power output.

In FIG. 5, the upper curve 38 is for a 75°C above ambient temperature steady state temperature and the lower curve 40 for a 65°C above ambient temperature limit. Since power output is proportional to armature current, curves of power output versus air gap width would be identical to curves 38 and 40 with only the scale along the ordinate of the graph being different.

As discussed above, it is necessary in constructing motors in accord with the present invention to employ permanent magnets having a high coercity and, therefore, a B/H curve which has a relatively gentle slope in the operating region. The reason for this can best be understood by reference to FIG. 4 in which reference character 42 identifies the operating portion of the magnetization curve for a permanent magnet motor employing Alnico, low coercive ceramic, or similar magnets. As shown in FIG. 4, the magnetization curve 42 for a permanent magnet motor employing low coercive magnets has a relatively steep slope. Accordingly, while a relatively small increase in air gap width produces a correspondingly small increase $\Delta H$ in field intensity, a relatively large decrease $\Delta B_1$ in flux density results. Since torque is proportional to flux density, only a small increase in air gap width will result in a marked decrease in power output. As discussed above, doubling the air gap width in such a motor will typically decrease the flux density by 50%. Therefore doubling the air gap width will reduce the power output of a motor employing low coercive magnets by 50%. This decrease is too large to be offset by the increase which can be realized by increasing the width and decreasing the length to width ratio of the air gaps in permanent magnet motors in accord with the present invention.

The principles of the present invention may be utilized in the design of permanent magnet machines of varying sizes and performance characteristics. They are particularly applicable, however, to small, high speed (greater than 3600 rpm) motors for hand-held power tools and the like and to generators having similar characteristics.

One such motor of this type in accord with the present invention has a casing diameter of two inches. The distance between bearing support members 12 and 14 is 3 inches, and the armature 16 is 1 5/32 inches in diameter. The demagnetization prevention coils 32 consist of approximately 40 turns of No. 24 wire and are connected in series with armature 16.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. An electrical machine comprising a rotatably mounted armature; high coercivity permanent magnets surrounding said armature and providing a stationary magnetic field, said magnets being spaced from said armature to provide air gaps therebetween, and said air gaps having a width of at least 0.040 inch and a length to width ratio of 60:1 or less, whereby said gaps provide passages for the flow of cooling air between the armature and magnets; and means for effecting a flow of air through said air gaps to cool said armature, whereby the steady state power rating of said machine can be increased without appreciably increasing the overall dimensions of the machine.

2. The electrical machine of claim 1, wherein said armature comprises a rotatably mounted shaft and wherein the machine further includes a fan fixed on said shaft for rotation therewith, said fan being adapted to circulate air through the gaps between the armature and the permanent magnets to thereby cool said armature.

3. The electrical machine of claim 1, together with means for preventing demagnetization of said permanent magnets comprising coils so wound on said permanent magnets as to produce a magnetic flux additive to that produced by the permanent magnets when energized.

4. The electrical machine of claim 1, wherein the permanent magnets are of the ceramic type.

5. The electrical machine of claim 1, wherein the air gap length to width ratio is 40:1 or less.

* * * * *